(12) United States Patent
Takizawa

(10) Patent No.: US 9,772,545 B2
(45) Date of Patent: Sep. 26, 2017

(54) LIGHT CONTROL UNIT, PROJECTOR, AND METHOD OF MANUFACTURING LIGHT CONTROL UNIT

(71) Applicant: Seiko Epson Corporation, Tokyo (JP)

(72) Inventor: Takahiro Takizawa, Suzaka (JP)

(73) Assignee: Seiko Epson Corporation, Tokyo (JP)

( * ) Notice: Subject to any disclaimer, the term of this patent is extended or adjusted under 35 U.S.C. 154(b) by 431 days.

(21) Appl. No.: 14/529,016

(22) Filed: Oct. 30, 2014

(65) Prior Publication Data

US 2015/0167929 A1 Jun. 18, 2015

(30) Foreign Application Priority Data

Dec. 12, 2013 (JP) ................................. 2013-256720

(51) Int. Cl.
*G03B 21/20* (2006.01)
*G03B 21/14* (2006.01)
*G03B 9/12* (2006.01)

(52) U.S. Cl.
CPC ............. *G03B 21/142* (2013.01); *G03B 9/12* (2013.01); *G03B 21/2053* (2013.01); *Y10T 29/4984* (2015.01)

(58) Field of Classification Search
CPC ........ G03B 9/12; G03B 9/14; G03B 21/2053; G03B 21/14
See application file for complete search history.

(56) References Cited

U.S. PATENT DOCUMENTS

| | | | |
|---|---|---|---|
| 7,163,299 B2 * | 1/2007 | Lee ...................... | G02B 5/005 |
| | | | 348/759 |
| 7,204,597 B2 * | 4/2007 | Yang ................... | G03B 21/145 |
| | | | 353/122 |
| 8,262,233 B2 | 9/2012 | Mochizuki | |
| 8,444,277 B2 * | 5/2013 | Hayashi ................. | G03B 9/14 |
| | | | 353/38 |
| 8,545,027 B2 | 10/2013 | Wakabayashi et al. | |

(Continued)

FOREIGN PATENT DOCUMENTS

| JP | 51-004339 U | 1/1976 |
|---|---|---|
| JP | 04-271332 A | 9/1992 |

(Continued)

*Primary Examiner* — William C Dowling
(74) *Attorney, Agent, or Firm* — ALG Intellectual Property, LLC

(57) ABSTRACT

A light control unit includes: a first light-shielding fin and a second light-shielding fin arranged to have a center axis of light passing therethrough interposed therebetween, and a moving device configured to move the first light-shielding fin and the second light-shielding fin so that respective end portions of the first light-shielding fin and the second light-shielding fin move in directions toward and away from each other, and the first light-shielding fin and the second light-shielding fin include: an arm moved by the moving device, and a light-shielding portion provided on the arm and configured to move with the arm to be arranged in a passage area of the light, and at least one of the first light-shielding fin and the second light-shielding fin includes an adjusting portion configured to adjust a mounting position between the arm and the light-shielding portion, the arm and the light-shielding portion being separate members.

11 Claims, 9 Drawing Sheets

(56) References Cited

U.S. PATENT DOCUMENTS

| | | | |
|---|---|---|---|
| 8,585,215 B2 * | 11/2013 | Nakano | G03B 21/16 353/56 |
| 8,801,195 B2 | 8/2014 | Mochizuki et al. | |
| 9,028,075 B2 * | 5/2015 | Kitahara | G03B 9/14 353/97 |
| 9,052,570 B2 * | 6/2015 | Yuzawa | F21V 11/183 |
| 2010/0238419 A1 | 9/2010 | Mochizuki | |
| 2011/0096302 A1 | 4/2011 | Mochizuki et al. | |
| 2011/0310358 A1 * | 12/2011 | Wakabayashi | G03B 21/14 353/38 |
| 2012/0147336 A1 * | 6/2012 | Chikahisa | G03B 21/2053 353/38 |

FOREIGN PATENT DOCUMENTS

| | | |
|---|---|---|
| JP | 2010-175679 A | 8/2010 |
| JP | 2010-217651 A | 9/2010 |
| JP | 2011-075909 A | 4/2011 |
| JP | 2011-118322 A | 6/2011 |
| JP | 2012-008184 A | 1/2012 |

\* cited by examiner

LIGHT CONTROL UNIT, PROJECTOR, AND METHOD OF MANUFACTURING LIGHT CONTROL UNIT

BACKGROUND

1. Technical Field

The present invention relates to a light control unit, a projector, and a method of manufacturing the light control unit.

2. Related Art

In the related art, a projector including a light source unit, a light-modulating unit configured to modulate light emitted from the light source unit, and a projection optical unit configured to project modulated optical flux is known. Known examples of such a projector include a projector provided with a light control unit arranged between the light source unit and the light-modulating unit, and configured to control the amount of light incident on the light-modulating unit to adjust luminance of an image to be projected (For Example, see JP-A-2010-217651).

The light control unit disclosed in JP-A-2010-217651 includes a pair of light-shielding members and a rotating mechanism. The rotating mechanism includes a motor, a transmitting unit to which the rotation of the motor is transmitted, and a pair of drive gears rotating in a direction opposite to each other by a rotational force transmitted by the transmitting unit. The drive gears are provided so as to be rotatable about an axis of rotation extending in a direction orthogonal to a center axis of the optical flux passing therethrough and, in addition, support the light-shielding members, respectively. When the drive gears are rotated, end portions of the respective light-shielding members move toward each other. Accordingly, the respective light-shielding members are arranged within a passage area of the optical flux, and consequently, at least part of the optical flux is shielded. In this manner, when light shielding by the respective light-shielding members is performed, the amount of light incident on the light-modulating unit is reduced, and the amount of light (luminance) of the image to be formed by the light-modulating unit is adjusted.

Here, in the light control unit disclosed in JP-A-2010-217651, in a state in which the respective light-shielding members are inserted into the passage area of the optical flux to a maximum extent (a state in which the light-shielding amount becomes maximum, hereinafter, referred to as totally-closed state), there may occur a case where the respective light-shielding members aggregate each other due to a dimensional tolerance of the light-shielding members. Specifically, in the light control unit designed so that a gap between the light-shielding members in the totally-closed state becomes small in order to further increase the light-shielding amount, a probability of hitting of the light-shielding members against each other due to variations in component dimensions disadvantageously increases.

SUMMARY

An advantage of some aspects of the invention is to provide a light control unit capable of arranging a light-shielding portion adequately and implementing shielding of passing light adequately, a projector and a method of manufacturing the light control unit.

A first aspect of the invention is directed to a light control unit including: a first light-shielding fin and a second light-shielding fin arranged to have a center axis of light passing therethrough interposed therebetween, and a moving device configured to move the first light-shielding fin and the second light-shielding fin so that respective end portions of the first light-shielding fin and the second light-shielding fin move in directions toward and away from each other, wherein the first light-shielding fin and the second light-shielding fin each include: an arm configured to engage the moving device and to be moved by the moving device; and a light-shielding portion provided on the arm and configured to move with the arm to be arranged in a passage area of the light, and at least one of the first light-shielding fin and the second light-shielding fin includes an adjusting portion configured to adjust a mounting position between the arm and the light-shielding portion, the arm and the light-shielding portion being separate members.

According to the first aspect, the arm and the light-shielding portion can be fixed in a state in which the mounting position therebetween is adjusted by the adjusting portion. Therefore, even though there arise variations in component dimensions in the light-shielding portion and the arm configured as the separate members, the light-shielding portion can be positioned at an adequate position of the respective light-shielding fins. Therefore, the shielding of the light passing therethrough is adequately achieved.

In the first aspect, it is preferable that the light-shielding portion includes a body portion arranged in the passage area and an extending portion extending from the body portion, and the adjusting portion is arranged either on the arm at a position corresponding to the extending portion or on the extending portion.

According to this configuration, the adjusting portion can be arranged at a position away from the body portion which tends to be raised to high temperature by shielding light. Therefore, an influence of heat generated by light shielding may be reduced, and a deformation of the adjusting portion and hence distortion of the light-shielding portion and the arm may be restrained.

In the first aspect, it is preferable that one of the arm and the light-shielding portion includes a hole portion to which a fixing member configured to fix the arm and the light-shielding portion is fixed, and the other one of the arm and the light-shielding portion includes an insertion hole as the adjusting portion, the insertion hole having an inner diameter larger than that of the hole portion and configured to allow insertion of the fixing member.

As the fixing member, a screw having a head portion larger than the inner diameter of the insertion hole is exemplified.

According to this configuration, fixation between the arm and the light-shielding portion is ensured by fixing the fixing member inserted through the insertion hole as the adjusting portion to the hole portion. In this case, with the insertion hole having a diameter larger than the diameter of the hole portion, the mounting position between the arm and the light-shielding portion can be adjusted reliably within a range where the hole portion is positioned in the insertion hole. Therefore, the arm and the light-shielding portion can be fixed reliably, and the adjustment of the mounting positions of these members is easily achieved, and the configuration of the adjusting portion may be simplified. The light-shielding portion which shields light is raised to high temperature. However, these members can be fixed reliably by employing the screw as the fixing member, in comparison with the case where an adhesive agent is used for the fixation between the arm and the light-shielding portion.

In the first aspect, it is preferable that the arm includes the adjusting portion, and the light-shielding portion includes the hole portion.

Here, the respective light-shielding portions need to be arranged at adequate positions on the respective light-shielding fins which are moved as described above. Therefore, when manufacturing the light control unit, conceivable arrangements if the arms and the light-shielding portions of the respective light-shielding fins are separate members include arranging the respective light shielding portions on a flat surface and then arranging the respective arms which engage the moving device so as to overlap with the respective light-shielding portions. Alternatively, conceivable arrangements if the arm and the light-shielding portion of only one of the light-shielding fins are separate members include arranging the light-shielding portion as a separate member on a flat surface, and then arranging the light-shielding portion of the other light-shielding fin so as to match the light-shielding portion, and arranging the arm as the separate member of the one of the light-shielding fins so as to overlap with the light-shielding portion arranged on the flat surface.

In both cases, since the arm is provided with the adjusting portion in the form of the insertion hole which allows insertion of the fixing member, and the light-shielding portion configured to be covered with the arm is provided with the hole portion to which the fixing member is fixed, the arm and the light-shielding portion arranged on the flat surface respectively can be fixed easily from the direction of arrangement of the arm with respect to the light-shielding portion.

A second aspect of the invention is directed to a projector including; a light source unit; a light-modulating unit configured to modulate light emitted from the light source unit; a projection optical unit configured to project modulated light; and the light control unit arranged on a light path of the light incident on the light-modulating unit from the light source unit.

According to the second aspect of the invention, since the same advantageous effects as those of the light control unit described above are achieved, light incident on the light-modulating unit can be shielded reliably, and the amount of light to be incident on the light-modulating unit can be adjusted reliably and adequately.

A third aspect of the invention is directed to a method of manufacturing a light control unit including: a first light-shielding fin and a second light-shielding fin arranged to have a center axis of light passing therethrough interposed therebetween, and a moving device configured to move the first light-shielding fin and the second light-shielding fin so that respective end portions of the first light-shielding fin and the second light-shielding fin move in directions toward and away from each other, the first light-shielding fin and the second light-shielding fin each include an arm configured to engage the moving device and to be moved by the moving device and a light-shielding portion provided on the arm and configured to move with the arm to be arranged in a passage area of the light, in at least one of the first light-shielding blade and the second light-shielding blade, (1) the arm and the light-shielding portion are formed as separate member respectively, (2) the light-shielding portion includes a hole portion to which a fixing member configured to fix the arm and the light-shielding portion is fixed, and (3) the arm includes an insertion hole having an inner diameter larger than that of the hole portion, formed at a position corresponding to the hole portion, and configured to allow insertion of the fixing member. The method includes: arranging the light-shielding portion configured as a separate member from the arm on a flat surface; overlapping the arm engaged with the moving device on the light-shielding portion arranged on the flat surface to position the arm with respect to the light-shielding portion in a state in which a relating position between the light-shielding portions of the first light-shielding fin and the second light-shielding fin is adjusted; and fixing the fixing member inserted into the insertion hole to the hole portion to fix the light-shielding portion and the arm in a state in which the relative position is maintained.

As the fixing member, a screw having a head portion larger than the inner diameter of the insertion hole is exemplified in the same manner as described above.

According to the third aspect, since the inner diameter of the insertion hole is larger than the inner diameter of the hole portion, even when misalignment caused by variations in component dimensions is generated between the light-shielding portion and the arm, the mounting positions of the arm and the light-shielding portion can be adjusted within a range where the hole portion is positioned in the insertion hole. Therefore, the light-shielding portions can be arranged at adequate positions on the respective light-shielding fins, and the light control unit which is capable of shielding light passing therethrough adequately may be manufactured easily.

In the third aspect, it is preferable that the manufacturing method includes pressing the light-shielding portion and the arm toward the flat surface to fix the light-shielding portion and the arm after the light-shielding portion and the arm have been positioned.

According to this configuration, the light-shielding portion and the arm are pressed against the flat surface, so that the state of alignment thereof may be maintained without rattling.

In the third aspect, it is preferable that the light control unit includes a frame member to which the moving device is attached, and the manufacturing method includes pressing the frame member in a direction substantially orthogonal to a direction of arrangement of the arm with respect to the light-shielding portion to position the light-shielding portion and the arm when positioning the arm with respect to the light-shielding portion.

According to this configuration, the frame member is biased in the direction substantially orthogonal to the direction of arrangement of the arm with respect to the light-shielding portion, so that the state in which the positions of the light-shielding portion and the arm are adjusted may be maintained. Therefore, fixation of the light-shielding portion and the arm is achieved further easily.

BRIEF DESCRIPTION OF DRAWINGS

The invention will be described with reference to the accompanying drawings, wherein like numbers reference like elements.

DESCRIPTION OF EXEMPLARY EMBODIMENTS

With reference to the drawings, embodiments of the invention will be described.

Schematic Configuration of Projector

Figure 1:
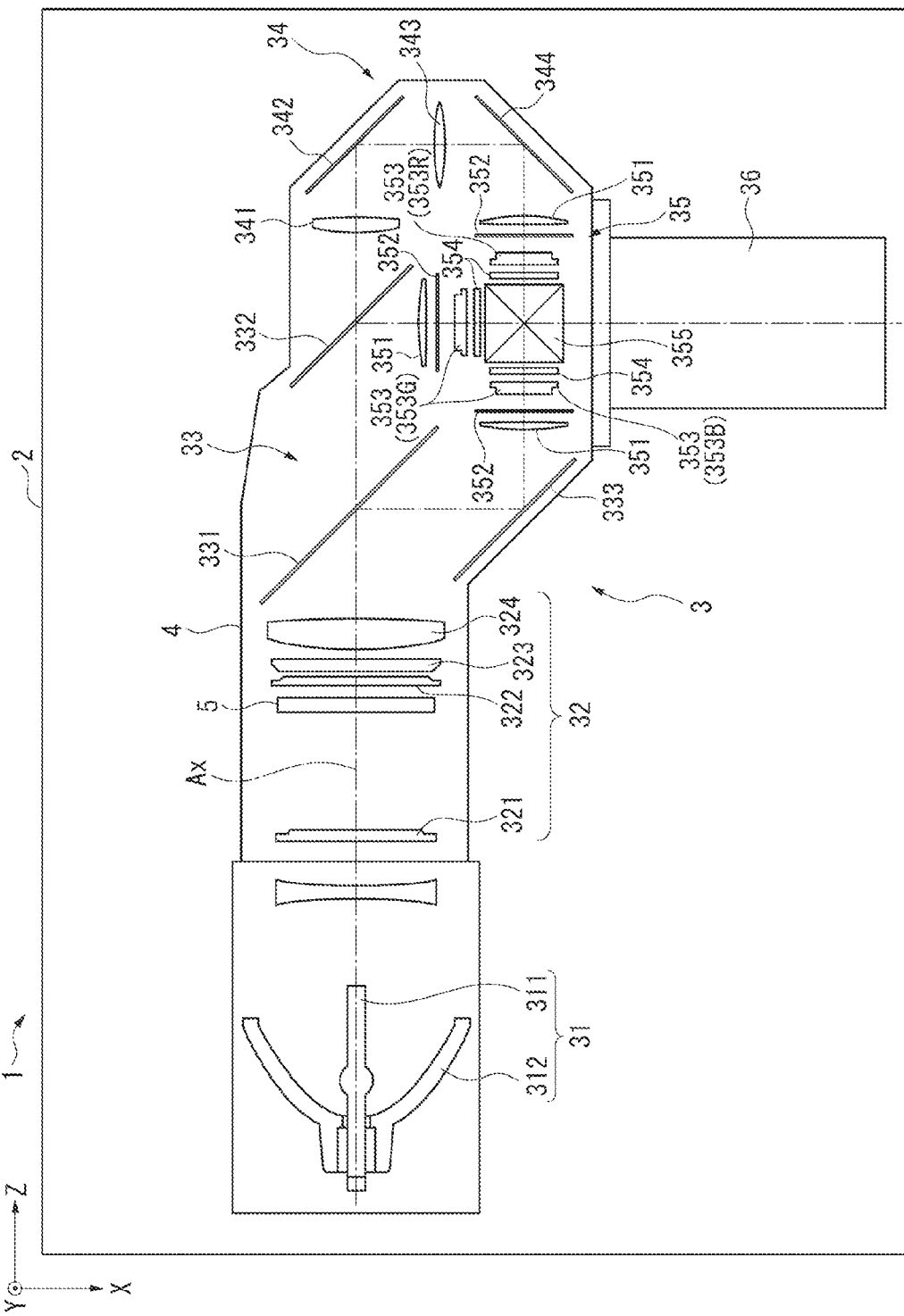
FIG. 1 is a schematic drawing illustrating a configuration of a projector according to an embodiment of the invention.

FIG. 1 is a schematic drawing illustrating a configuration of a projector 1 according to the embodiment. In the drawings and description given below, a Z-direction indicates a direction of travel of light at the time of outgoing from a light source unit 31, and an X-direction and a Y-direction indicate directions orthogonal to the Z-direction and orthogonal to each other. In the case where the projector 1 is placed on an installation table or the like, for example, the Y-direction is an upward direction (in other words, a direction directed from a bottom surface of an external housing 2 to a ceiling surface), which is a direction opposite to a perpendicular direction, and the X-direction is a direction directed from the left to the right when viewed from the Z-direction side (a proximal side of the direction of travel of light).

The projector 1 according to the embodiment projects an image according to image information onto a projected surface such as a screen in an enlarged scale. The projector 1 includes the external housing 2 and an optical apparatus 3 configured to be housed in the external housing 2 as illustrated in FIG. 1. In addition, although illustration is omitted, the projector 1 includes a control unit configured to control the projector 1, a power source unit configured to supply electric power, and a cooling unit configured to cool a cooling object.

Configuration of Optical Apparatus

The optical apparatus 3 forms and projects an image in accordance with image information. The optical apparatus 3 includes the light source unit 31, various types of optical units 32 to 36, and an optical component housing 4 supporting these units.

The light source unit 31 includes a light source lamp 311 and a reflector 312, and emits an optical flux to an illumination optical unit 32.

The illumination optical unit 32 equalize illuminance in a plane orthogonal to a center axis of the optical flux emitted from the light source unit 31. The illumination optical unit 32 includes a first lens array 321, a light control unit 5, a second lens array 322, a polarization conversion element 323, and a superimposing lens 324 in the incident order of light from the light source unit 31.

Although detailed illustration is omitted, the first lens array 321 has a configuration in which a plurality of first small lenses configured to split the optical flux emitted from the light source unit 31 into a plurality of optical flux portions are arranged in a matrix pattern. The second lens array 322 has a configuration in which a plurality of second small lenses corresponding to the first small lenses of the first lens array 321 is arranged in a matrix pattern. The second lens array 322 and the superimposing lens 324 superimpose the respective incident optical flux portions with an image forming area of a liquid crystal panel 353, which will be described later, to illuminate the image forming area uniformly.

The polarization conversion element 323 aligns the direction of polarization of incident light in one direction.

The light control unit 5 shields at least part of the light incident on the second lens array 322 via the first lens array 321 to adjust the amount of light incident on the second lens array 322, and thus on the liquid crystal panel 353. The configuration of the light control unit 5 will be described in detail later.

A color separating optical unit 33 splits the optical flux incident from the illumination optical unit 32 into three colored light, namely, red (R), green (G), and blue (B). The color separating optical unit 33 includes dichroic mirrors 331 and 332 and a reflection mirror 333.

A relay optical unit 34 is provided on a light path for red light, which has a light path longer than those of other colored light from among the split three colored light. The relay optical unit 34 includes an incident side lens 341, a relay lens 343, and reflection mirrors 342 and 344.

An electric optical unit 35 is configured to modulate the split colored lights respectively in accordance with image information thereof, and combine the respective modulated colored lights. The electric optical unit 35 includes three field lenses 351 provided for the respective colors, three incident side polarization plates 352, three liquid crystal panels 353 as the light-modulating units (the liquid crystal panels for red, green, and blue are denoted by 353R, 353G, and 353B, respectively), three outgoing side polarization plates 354, and a cross dichroic prism 355 as a color combining optical unit configured to combine the respective modulated colored lights.

A projection optical unit 36 is a projection lens configured to project the combined colored light (the optical flux which forms the image) onto the projected surface in an enlarged scale.

Although detailed illustration is omitted, the optical component housing 4 includes a component housing member provided with a groove portion for housing respective optical components, a lid-shaped member configured to close an opening for housing components formed in the component housing member, and a supporting member configured to support the projection optical unit 36.

The optical component housing 4 has an illumination optical axis Ax, and the light source unit 31 and the respective optical units 32 to 36 are arranged at predetermined positions with respect to the illumination optical axis Ax. Therefore, when the light source unit 31 is arranged in the optical component housing 4, the center axis of light emitted from the light source unit 31 matches the illumination optical axis Ax.

Configuration of Light Control Unit

Figure 2:
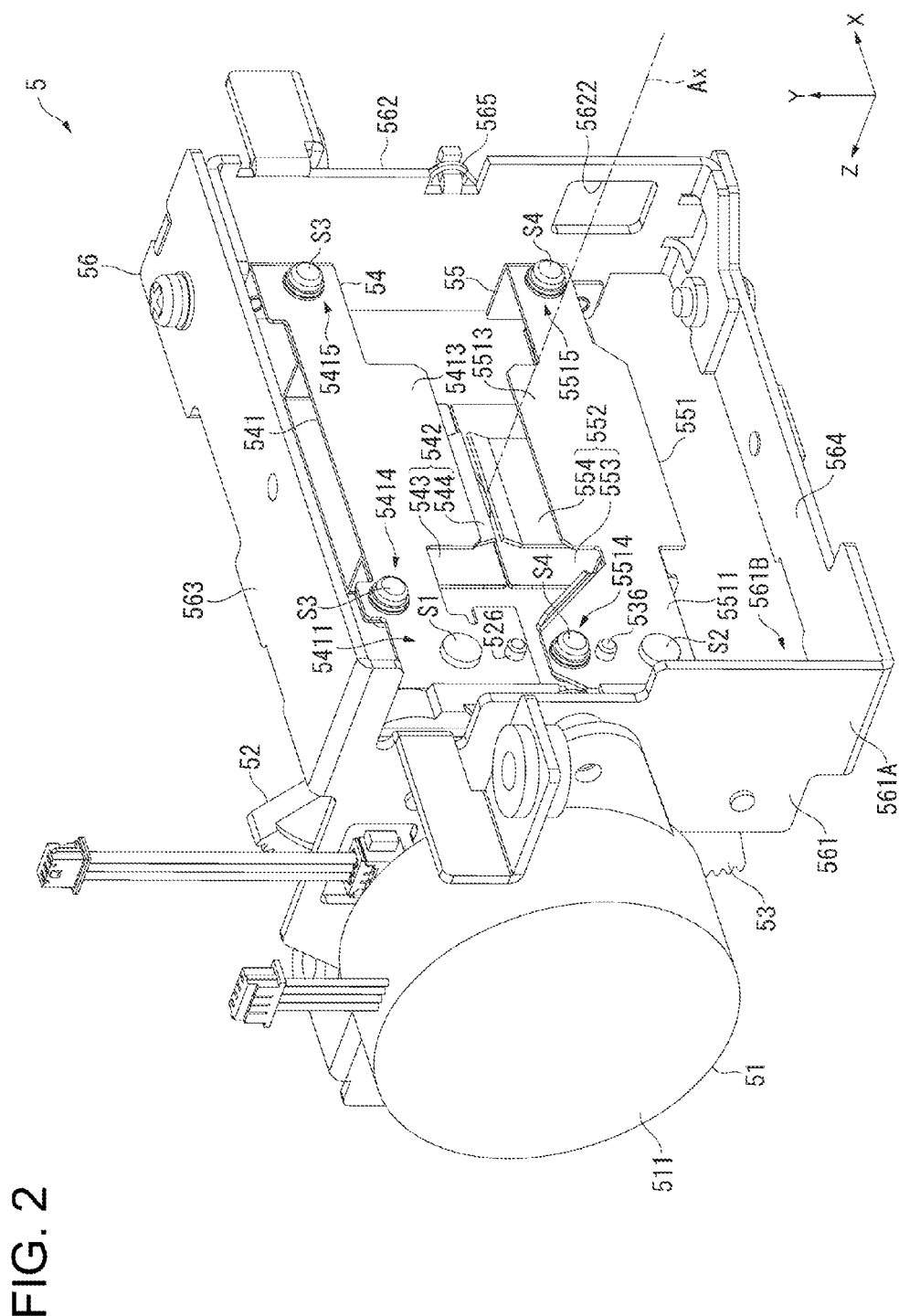
FIG. 2 is a perspective view illustrating a light control unit of the embodiment.
Figure 3:
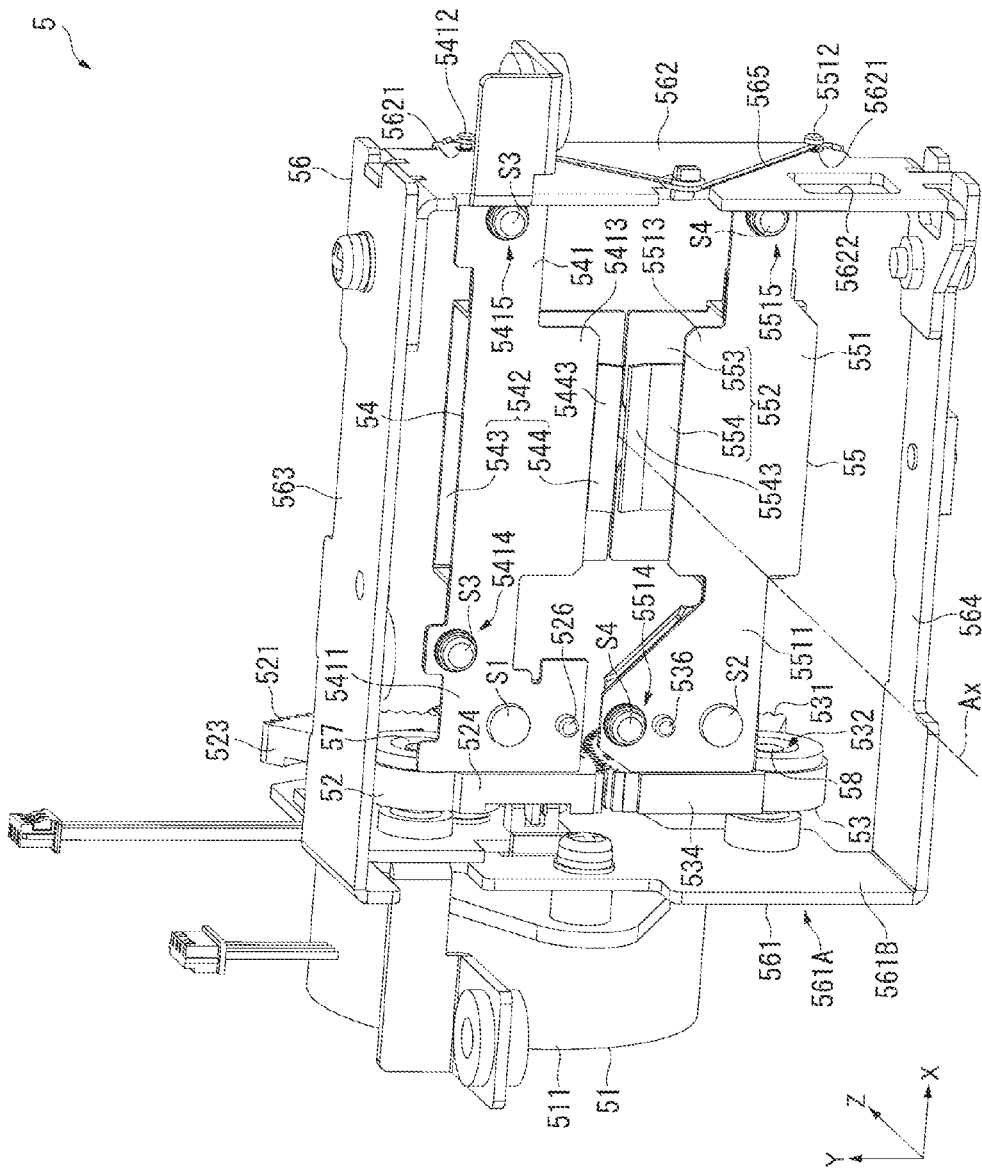
FIG. 3 is a perspective view illustrating the light control unit of the embodiment.
Figure 4:
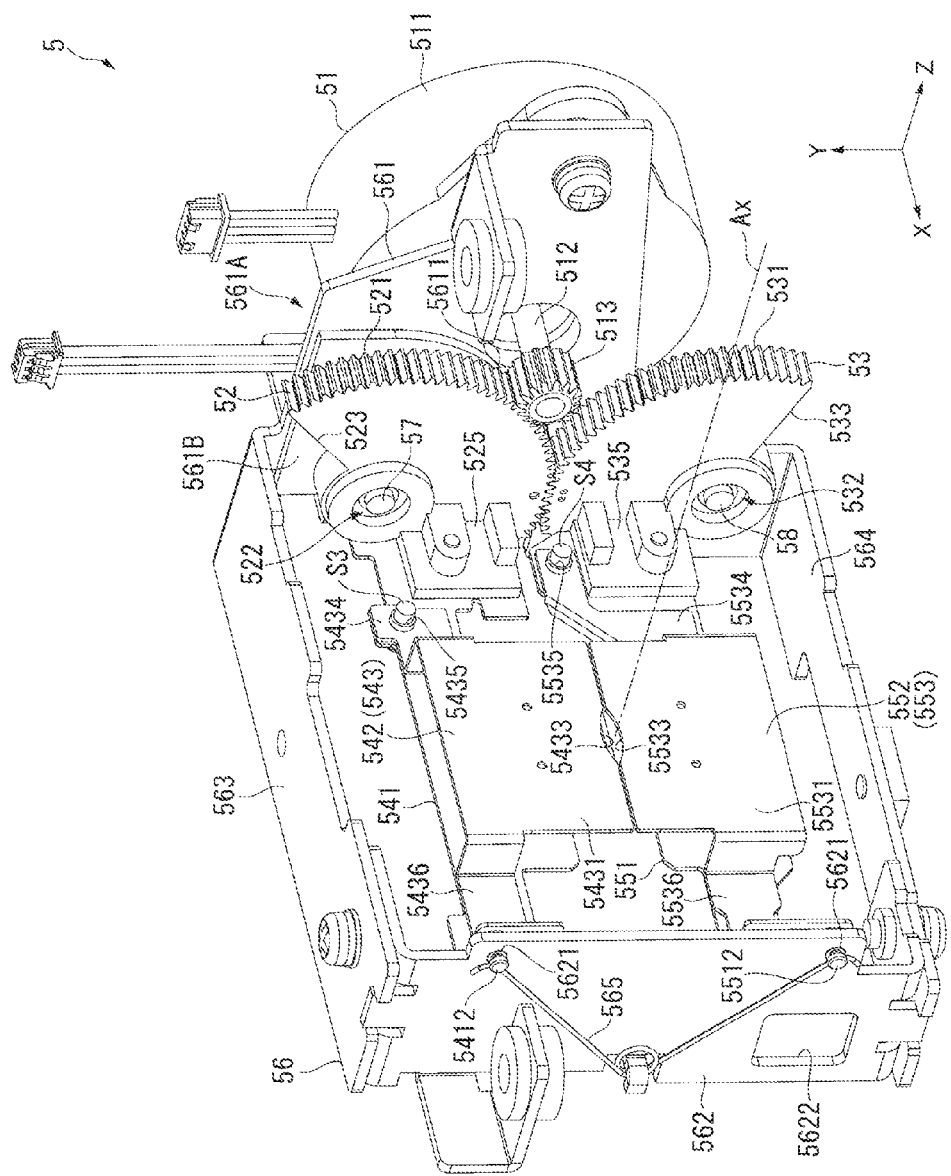
FIG. 4 is a perspective view illustrating the light control unit of the embodiment.

FIG. 2 to FIG. 4 are perspective view illustrating the light control unit 5. FIG. 2 and FIG. 3 are perspective view of the light control unit 5 in a state in which light-shielding fins 54 and 55 are in a totally-closed state (a state in which a light-shielding amount is maximized, and the light-shielding fins 54 and 55 are brought into the closest position) viewed from a light-incident side, and FIG. 4 is a perspective view illustrating the light control unit 5 viewed from a light emitting side.

The light control unit 5 is arranged between the first lens array 321 and the second lens array 322. The light control unit 5 includes a motor 51, gears 52 and 53, the light-shielding fins 54 and 55 and a frame member 56 as illustrated in FIG. 2 to FIG. 4, and is configured as a unit. The motor 51 and the gears 52 and 53 constitute part of a moving device according to the invention.

Configuration of Frame Member

The frame member 56 is formed into a substantially quadrangular prism having a hollow interior. Specifically, the frame member 56 includes a first surface portion 561 and a second surface portion 562 extending along an YZ plane and facing each other, and a third surface portion 563 and a fourth surface portion 564 extending along an XZ plane and facing each other. The first surface portion 561 is located at a position opposite to the X-direction with respect to the second surface portion 562, and the third surface portion 563 is located at a position on the Y-direction side with respect to the fourth surface portion 564.

The motor 51 and the gears 52 and 53 are attached to the first surface portion 561.

As illustrated in FIG. 3 and FIG. 4, the second surface portion 562 includes hole portions 5621 which allows insertion of pin-shaped portions 5412 and 5512 provided on the light-shielding fins 54 and 55, and a circulating port 5622 configured to release air heated by the light-shielding fins 54 and 55 in the frame member 56 to the outside.

In addition, the second surface portion 562 is provided with an urging member 565 configured to engage the pin-shaped portions 5412 and 5512 to prevent the pin-shaped portions 5412 and 5512 from dropping from the second surface portion 562. The urging member 565 is formed into a V-shape in plan view by extending a pair of end portions of a coil spring, in the embodiment.

Configuration of Motor

The motor 51 is a drive device configured to generate a drive force for moving the light-shielding fins 54 and 55, and in the embodiment, is composed of a stepping motor controlled by the control unit. As illustrated in FIG. 4, the motor 51 includes a motor body 511 and a gear 513 provided on a rotating shaft 512 extending from the motor body 511.

The motor body 511 is fixed to an outer surface 561A (the surface opposite to the second surface portion 562) of the first surface portion 561 of the frame member 56 with a screw, and the rotating shaft 512 is inserted into a hole portion 5611 formed in the first surface portion 561.

The gear 513 is provided at a distal end of the rotating shaft 512, and engages the gear 52.

Configuration of Gear

The gears 52 and 53 functions as a transmitting device to which the rotational force of the motor 51 is transmitted, and functions also as a supporting device configured to support the light-shielding fins 54 and 55.

The gears 52 and 53 each have a substantially ⅓ circle as illustrated in FIG. 4.

The gear 52 includes a hole portion 522 at an end portion thereof on the side opposite to an arcuate-shaped portion 521. A pin 57 to be fixed to an inner surface 561B (the surface opposing the second surface portion 562) of the first surface portion 561 is inserted into the hole portion 522, whereby the gear 52 is rotatably supported by the inner surface 561B.

In contrast, the arcuate-shaped portion 521 includes a plurality of teeth which engage the gear 513. Therefore, the gear 52 rotates about a center axis (a rotating axis along the X-direction) of the pin 57 in association with the rotation of the gear 513.

A fixing portion 525 is provided on an edge portion 524 side of a pair of edge portions 523 and 524 (the edge portion 524 is illustrated in FIG. 3) connected by the arcuate-shaped portion 521 so as to project toward the second surface portion 562 (on the X-direction side). The fixing portion 525 includes a screw hole (not illustrated) and a positioning pin 526 (see FIG. 3) projecting on the light-incident side. As illustrated in FIG. 3, an arm 541 of the light-shielding fin 54 positioned by the positioning pin 526 inserted therethrough and thereby is fixed to the fixing portion 525 with a screw S1 inserted into the arm 541 and screwed into the screw hole.

The gear 53 has the same shape and configuration as the gear 52.

Specifically, the gear 53 is provided with a hole portion 532 at an end portion opposite to an arcuate-shaped portion 531 as illustrated in FIG. 4. The gear 53 is rotatably supported by the inner surface 561B by a pin 58 inserted through the hole portion 532 in the same manner as the gear 52.

In contrast, the arcuate-shaped portion 531 includes a plurality of teeth engaging with the plurality of teeth formed on the arcuate-shaped portion 521. Therefore, the gear 53 rotates in a direction opposite to the gear 52 in association with the rotation of the gear 52.

A fixing portion 535 is provided on an edge portion 534 side of a pair of edge portions 533 and 534 (the edge portion 534 is illustrated in FIG. 3) connected by the arcuate-shaped portion 531 so as to project toward the second surface portion 562 (on the X-direction side). The fixing portion 535 includes the screw hole (not illustrated) and a positioning pin 536 (see FIG. 3) projecting on the light-incident side in the same manner as the fixing portion 525. As illustrated in FIG. 3, an arm 551 of the light-shielding fin 55 positioned by the positioning pin 536 inserted therethrough and thereby is fixed to the fixing portion 535 with a screw S2 to be inserted into the arm 541 and screwed into the screw hole.

Configuration of Light-Shielding Fins

The light-shielding fins 54 and 55 correspond to the first light-shielding fin and the second light-shielding fin according to the invention. The light-shielding fins 54 and 55 are arranged symmetrically about a center axis of light emitted from the first lens array 321 (that is, the illumination optical axis Ax) as illustrated in FIG. 2 to FIG. 4, and rotate in association with the rotation for the gears 52 and 53 in a direction toward or away from each other by the same angle and the same amount of movement. In other words, the light-shielding fins 54 and 55 are arranged so as to oppose each other about the center axis and, in other words, are arranged with the center axis interposed therebetween.

The light-shielding fin 54 is positioned on the Y-direction side with respect to the light-shielding fin 55. The light-shielding fin 54 includes the arm 541, and a light-shielding portion 542 located on the light emitting side (z-direction side) with respect to the arm 541, and attached to the arm 541 with screws S3.

Configuration of Arm

The arm 541 is a plate-shaped member formed by bending a metal sheet and having a substantially F-shape facing sideward, and is fixed to the gear 52 so that a longitudinal direction thereof extends in the X-direction. The arm 541 includes a mounting portion 5411 (FIG. 2 and FIG. 3) fixed to the fixing portion 525 at an end portion on the gear 52 side (the opposite side from the X-direction) and the pin-shaped portion 5412 (FIG. 3 and FIG. 4) provided at an end portion on the opposite side from the gear 52 and inserted through the hole portions 5621 of the second surface portion 562.

The arm 541 includes an arm-side light-shielding portion 5413 projecting from a substantially center of the arm 541 to the light-shielding fin 55 side and configured to be arranged within the passage area of light in association with the rotation of the gear 52. The arm-side light-shielding portion 5413 is formed so as to be overlapped with part of the light-shielding portion 542, and configured to shield the incident light.

In addition, the arm 541 includes adjusting portions 5414 and 5415 provided out of the passage area of light (that is, the outside of the arm-side light-shielding portion 5413 of the arm 541) apart from each other for mounting the light-shielding portion 542 on the arm 541 after positional adjustment along the arm 541. Specifically, the adjusting portion 5414 is arranged on the arm 541 on the end portion side opposite to the X-direction, and the adjusting portion 5415 is arranged at the end portion thereof on the X-direction side. The configuration of the adjusting portions 5414 and 5415 will be described in detail together with the positional adjustment of the arm 541 with respect to the light-shielding portion 542.

Configuration of Light-Shielding Portion

Figure 5:
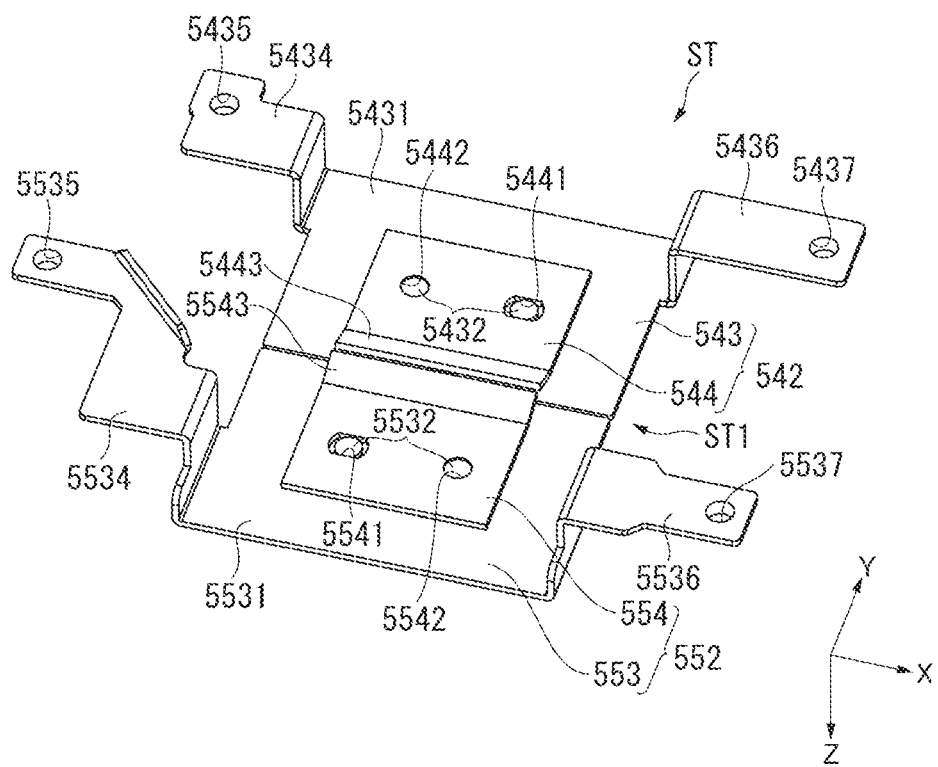
FIG. 5 is a perspective view illustrating a light-shielding portion of the embodiment.

FIG. 5 is a perspective view illustrating light-shielding portions 542 and 552 in the totally-closed state. In other words, FIG. 5 is a perspective view illustrating the light-shielding portions 542 and 552 placed on a stage ST of a jig in a step of positioning the light-shielding fin, which will be described later.

The light-shielding portion 542 is arranged in the passage area of light incident on the second lens array 322 from the first lens array 321 in association with the rotation of the gear 52, and is configured to shield the light. The light-shielding portion 542 includes a first light-shielding portion 543 and a second light-shielding portion 544 as illustrated in FIG. 5.

The second light-shielding portion 544 is a plate member having a substantially rectangular shape positioned on the light incident side (the side opposite to the Z-direction) with respect to the first light-shielding portion 543. The second light-shielding portion 544 has an elongated hole 5441 and a hole 5442 at a substantially center portion thereof. The second light-shielding portion 544 is heat bonded to the first light-shielding portion 543 in a state in which projections 5432 projecting from the first light-shielding portion 543 are inserted into the elongated hole 5441 and the hole 5442 and positioned therein.

The second light-shielding portion 544 includes an inclined portion 5443 inclined so that an end portion which comes on the light-shielding fin 55 side (the illumination optical axis Ax side) when being mounted on the first light-shielding portion 543 is away from an end portion of the first light-shielding portion 543 in the same direction.

The first light-shielding portion 543 is a plate member formed into a substantially T-shape by bending a metal sheet, and is attached to the arm 541. The first light-shielding portion 543 includes a body portion 5431 having a flat surface for attaching the second light-shielding portion 544 and configured to shield incident light and a pair of extending portions 5434 and 5436 bent from the body portion 5431 to the light incident side (the side opposite to the Z-direction) and then extend in the directions away from each other (X-direction).

The body portion 5431 is formed into a substantially rectangular shape, and includes the pair of substantially circular column shaped projections 5432 at substantially center thereof. These projections 5432 are inserted into the elongated hole 5441 and the hole 5442 described above. Since the hole to which one of the projections 5432 is to be inserted is the elongated hole 5441, even though the positions of the projections 5432 and the positions of the elongated hole 5441 and the hole 5442 are misaligned from the positions in design, the second light-shielding portion 544 can be attached adequately to the first light-shielding portion 543.

On the body portion 5431 at a substantially center of the end portion on the light-shielding fin 55 side, an arcuate depression 5433 (see FIG. 4) depressed toward the center of the body portion 5431 is formed although illustration is omitted in FIG. 5.

The pair of extending portions 5434 and 5436 include hole portions 5435 and 5437 at positions corresponding to the adjusting portions 5414 and 5415 as screw holes. Specifically, the hole portion 5435 is provided in the vicinity of a distal end portion of the extending portion 5434 extending in the direction opposite to the X-direction, and the hole portion 5437 is provided in the vicinity of a distal end portion of the extending portion 5436 extending in the X-direction. The first light-shielding portion 543 is fixed to the arm 541 by screwing the screws S3 (see FIG. 2 and FIG. 3) inserted through the adjusting portions 5414 and 5415 into the corresponding hole portions 5435 and 5437 respectively.

The light-shielding fin 55 has the same configuration as the light-shielding fin 54. Specifically, the light-shielding fin 55 includes the arm 551 to be attached to the gear 53 so that the longitudinal direction extends along the X-direction, and the light-shielding portion 552 attached to the arm 551 as illustrated in FIG. 2 to FIG. 4.

The arm 551 includes a mounting portion 5511 (FIG. 2 and FIG. 3) to be attached to the fixing portion 535 of the gear 53 at an end portion opposite to the X-direction, and the pin-shaped portions 5512 (see FIG. 3 and FIG. 4) to be inserted into the hole portions 5621 of the second surface portion 562 at an end portion on the X-direction side in the same manner as the arm 541.

Furthermore, the arm 551 includes an arm-side light-shielding portion 5513 (FIG. 2 and FIG. 3) having a substantially rectangular shape projecting from the substantially center of the arm 551 toward the light-shielding fin 54 (toward the illumination optical axis Ax).

In addition, the arm 551 includes two adjusting portions 5514 and 5515 having the same function as the adjusting portions 5414 and 5415 described above at positions out of the passage area of light (outside the arm-side light-shielding portion 5513 at the arm 551) at positions apart from each other. Specifically, the adjusting portion 5514 is arranged on the arm 551 in the vicinity of the end portion side opposite to the X-direction, and the adjusting portion 5515 is arranged in the vicinity of the end portion thereof on the X-direction side. The configuration of the adjusting portions 5514 and 5515 will be described later in detail together with the positional adjustment of the arm 551 with respect to the light-shielding portion 552.

The light-shielding portion 552 is arranged in the passage area of light in association with the rotation of the gear 53, and shields the light. The light-shielding portion 552 has the same configuration as the light-shielding portion 542, and includes a first light-shielding portion 553 and a second light-shielding portion 554 as illustrated in FIG. 5.

The first light-shielding portion 553 is formed into a substantially T-shape like the first light-shielding portion 543, and includes a body portion 5531, and extending portions 5534 and 5536 bent from both ends of the body portion 5531 to the light incident side (the side opposite to the Z-direction), and extends in the directions away from each other along the X-direction.

The body portion 5531 has two substantially column shaped projections 5532 projecting toward the second light-shielding portion 554 at a substantially center thereof. In addition, the body portion 5531 includes a substantially arcuate shaped depression 5533 (see FIG. 4) depressed toward the center of the body portion 5531 at an end portion on the light-shielding fin 54 side (the illumination optical axis Ax side) although not illustrated in FIG. 5.

The extending portion 5534 extending in the direction opposite to the X-direction has a hole portion 5535 as a screw hole in the vicinity of the distal end portion thereof at a position corresponding to the adjusting portion 5514. The extending portion 5536 extending in the X-direction includes a hole portion 5537 as a screw hole in the vicinity of the distal end portion thereof at a position corresponding to the adjusting portion 5515. With the screws S3 inserted through the adjusting portions 5514 and 5515 screwed into the corresponding hole portions 5535 and 5537, the first light-shielding portion 553 is fixed to the arm 551.

The second light-shielding portion 554 is a substantially rectangular shaped plate member to be heat bonded to the body portion 5531 from the light incident side, and arranged in the passage area of light in association with the rotation of the gear 53 to shield the light.

The second light-shielding portion 554 includes an elongated hole 5541 and a hole 5542 in which the projections 5532 are inserted respectively in the same manner as the second light-shielding portion 544 at a substantially center thereof.

The second light-shielding portion 554 includes an inclined portion 5543 inclined in a direction away from the end portion provided at an end portion side of the body portion 5531 where the depression 5533 is formed.

Light Shielding by Light Control Unit

In the case where the light-shielding fins 54 and 55 are in the totally-closed state, as illustrated in FIG. 2 to FIG. 4, the arm-side light-shielding portions 5413 and 5513, the body portions 5431 and 5531, and the second light-shielding portions 544 and 554 are arranged in the passage area of light emitted from the first lens array 321, and these portions are substantially orthogonal to the center axis of the light (illumination optical axis Ax). Accordingly, almost all of the light is shielded and the amount of light incident on the liquid crystal panels 353 is minimized.

In the case where the gears 52 and 53 rotate and the light-shielding fins 54 and 55 move in the direction in which a gap between the light-shielding fins 54 and 55 increases, the light-shielding amount by the configuration described above is reduced, and the amount of light passing therethrough is increased. Accordingly, the amount of light incident on the liquid crystal panels 353 is increased.

Figure 6:
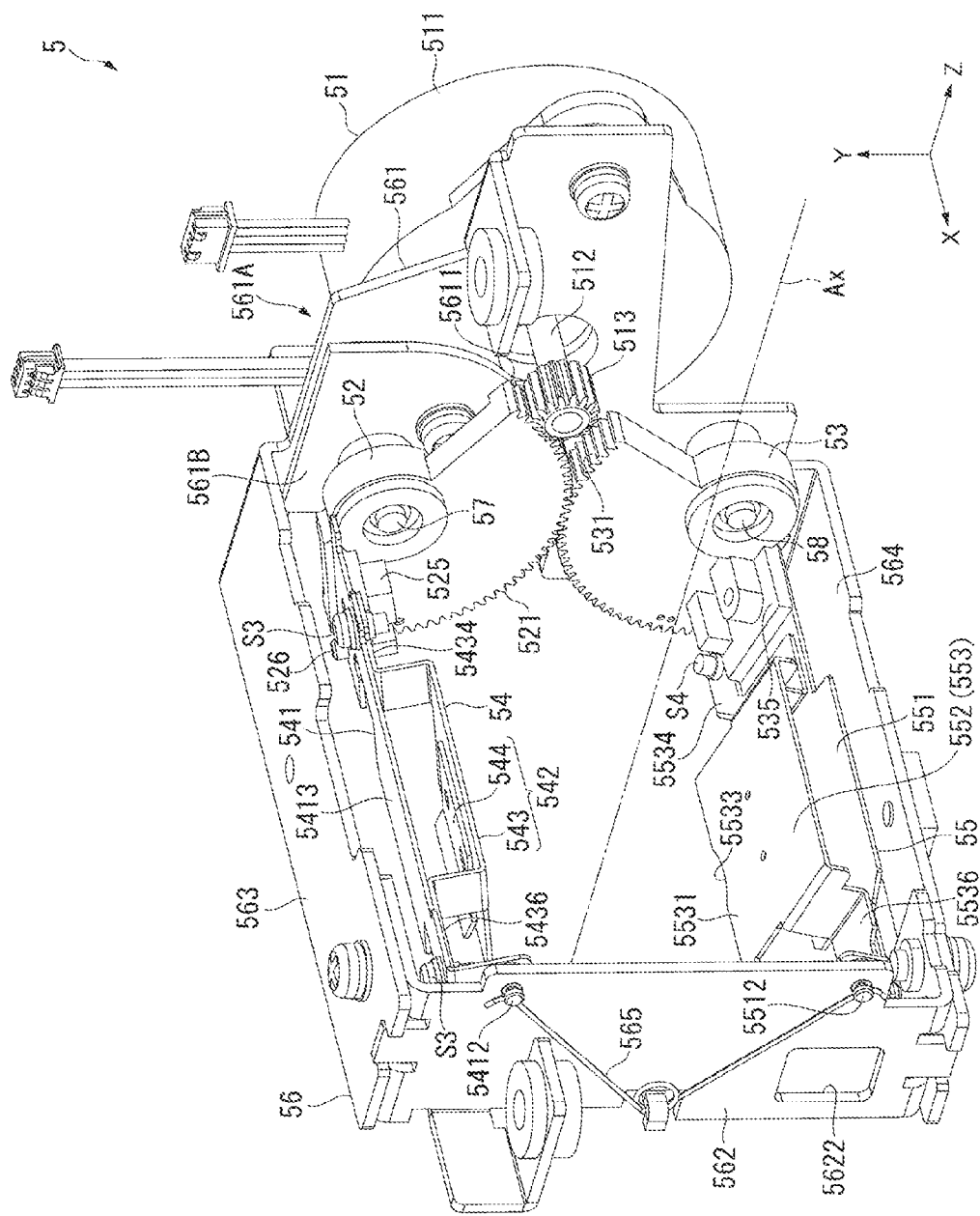
FIG. 6 is a perspective view illustrating the light control unit of the embodiment.

FIG. 6 illustrates the light control unit 5 in a state in which the light-shielding fins 54 and 55 are in a totally-opened state (a state in which a light-shielding amount is minimized, and the light-shielding fins 54 and 55 are moved away from each other to the maximum extent), and is a perspective view illustrating the light control unit 5 viewed from the light emitting side.

When the gears 52 and 53 rotate and the light-shielding fins 54 and 55 become the totally-opened state, the light-shielding fins 54 and 55 are not positioned in the passage area of light outgoing from the first lens array 321 as illustrated in FIG. 6. Accordingly, almost all of the light outgoing from the first lens array 321 is incident on the second lens array 322, and the amount of light incident on the liquid crystal panels 353 is maximized.

When the light-shielding fin 54 is in the totally-closed state, although the distal end portion of the arm-side light-shielding portion 5413 (that is, the end portion on the illumination optical axis Ax side) is positioned on the side opposite to the illumination optical axis Ax side with respect to the end portions of the inclined portion 5443 and the first light-shielding portion 543 in the same direction, the arm-side light-shielding portion 5413 is also positioned in the passage area of the light. The same applies to the arm-side light-shielding portion 5513.

Therefore, in the case where the light-shielding fins 54 and 55 are in the totally-closed state, the heat generated by light shielding may be dispersed by the light-shielding portions 542 and 552 and the arms 541 and 551 positioned on the light incident side with respect to the light-shielding portions 542 and 552. Therefore, with the provision of the arm-side light-shielding portions 5413 and 5513 on the arms 541 and 551, the temperature of the second lens array 322 positioned on a downstream of the light path (Z-direction) of the light control unit 5 is restrained from raising by radiation heat of the light-shielding fins 54 and 55 at the time of light shielding.

The light-shielding portions 542 and 552 include the first light-shielding portions 543 and 553 and the second light-shielding portions 544 and 554 positioned on the light incident side, and passing light is shielded by the second light-shielding portions 544 and 554 and the body portions 5431 and 5531 depending on the state of rotation of the light-shielding fins 54 and 55. In this configuration, the heat generated by the light shielding may be dispersed to the first light-shielding portions 543 and 553 and the second light-shielding portions 544 and 554. Therefore, deterioration of the light-shielding fins 54 and 55 may be restrained.

Furthermore, when the light-shielding fins 54 and 55 are in the totally-closed state, the end portions of the first light-shielding portions 543 and 553 (in other words, the end portions on the illumination optical axis Ax side) in proximity to each other are provided with the arcuate shaped depressions 5433 and 5533. Accordingly, when moving the light-shielding fins 54 and 55 into and out of the passage area of light, illuminance distribution of the light passing therethrough (that is, light which can be superimposed on the liquid crystal panels 353) can be maintained to be uniform and, in addition, gentle dimming is achieved.

In addition, with the second light-shielding portions 544 and 554 having the inclined portions 5443 and 5543 described above, the amount of passing light is prevented from being changed step by step when moving the light-shielding fins 54 and 55 into and out of the passage area of light. In addition, occurrence of color unevenness is restrained, and the illuminance distribution may be maintained uniformly.

Method of Manufacturing Light Control Unit

The light control unit 5 is assembled through a step of positioning the light-shielding portion, a step of aligning the arm position, and a step of fixing the light-shielding fins given below whereby the light control unit 5 is manufactured.

Step of Positioning Light-Shielding Portion

In the step of positioning the light-shielding portion, the light-shielding portions 542 and 552 are placed on the stage ST, which is a flat surface such as a jig as illustrated in FIG. 5. At this time, the light-shielding portions 542 and 552 are arranged so that the first light-shielding portions 543 and 553 are placed on the stage ST, and the end portions of the first light-shielding portions 543 and 553 provided with the depressions 5433 and 5533 are arranged so as to face each other as described above.

Although the illustration is omitted, the stage ST is provided with depressions in which the body portions 5431 and 5531 are fitted. The depressions are provided with a projecting ridge ST1 having a set value corresponding to the dimension between the end portions of the first light-shielding portions 543 and 553 (end portions at which the depressions 5433 and 5533 are formed) on the illumination optical axis Ax side. Therefore, a state in which the dimension between the end portions becomes the set value is maintained by the light-shielding portions 542 and 552 being pressed by a first pressing device (not illustrated) provided on the jig in the direction toward each other. The set value is a value considering a thermal expansion of the light-shielding fins 54 and 55 (specifically the light-shielding portions 542 and 552), and is set so that the light-shielding portions 542 and 552 do not come into abutment with each other in the totally-closed state even though the thermal expansion is generated.

Step of Aligning Arm Position

Figure 7:
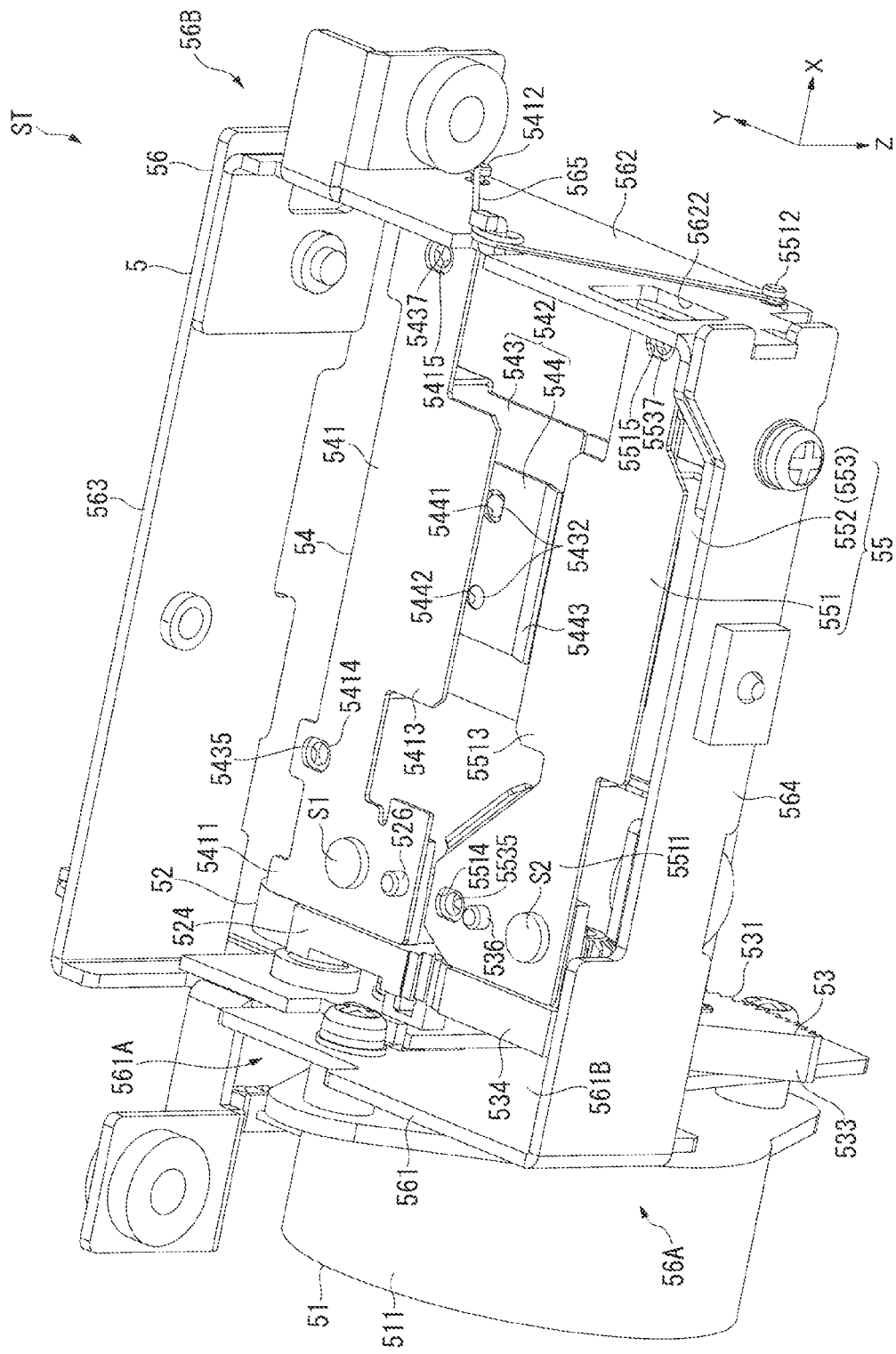
FIG. 7 is a drawing illustrating a step of aligning an arm of the embodiment.

FIG. 7 is a perspective view for explaining a step of aligning the arm position. Specifically, FIG. 7 is a perspective view illustrating a state in which the light-shielding portions 542 and 552 and the arms 541 and 551 attached to the gears 52 and 53 respectively are aligned in position viewed from the light incident side.

In the step of aligning the arm position, as illustrated in FIG. 7, the arms 541 and 551 are arranged so as to overlap with the corresponding light-shielding portions 542 and 552 arranged on the stage ST. At this time, the positions of the hole portions 5435 and 5437 of the light-shielding portion 542 and the adjusting portions 5414 and 5415 of the arm 541 are aligned and positions of the hole portions 5535 and 5537 of the light-shielding portion 552 and the adjusting portions 5514 and 5515 of the arm 551 are aligned.

The adjusting portions 5414 and 5415 each are formed of an elongated circle shaped hole portion having a long diameter in a short direction orthogonal to a longitudinal direction (X-direction) of the arm 541 (the Y-direction where the light-shielding fin 54 is in the totally-closed state). The long diameter and a short diameter of the adjusting portions 5414 and 5415 are larger than an inner diameter of the corresponding hole portions 5435 and 5437.

Accordingly, when fixing the arm 541 and the light-shielding portion 542, the arm 541 can be adjusted in position along the arm 541 with respect to the light-shielding portion 542 within a range where the hole portion 5435 is positioned in the adjusting portion 5414, and the hole portion 5437 is positioned in the adjusting portion 5415.

In the same manner, the adjusting portions 5514 and 5515 each are formed of the elongated circle shaped hole portion having a long diameter in the short direction orthogonal to the longitudinal direction (X-direction) of the arm 551 (the Y-direction where the light-shielding fin 55 is in the totally-closed state). The long diameter and the short diameter of the adjusting portions 5514 and 5515 are larger than an inner diameter of the corresponding hole portions 5535 and 5537.

Accordingly, when fixing the arm 551 and the light-shielding portion 552, the arm 551 can be adjusted in position along the arm 551 with respect to the light-shielding portion 552 within a range where the hole portion 5535 is positioned in the adjusting portion 5514, and the hole portion 5537 is positioned in the adjusting portion 5515.

The jig, although illustration is omitted, is provided with a substantially L-shaped projecting portion projecting from the stage ST and extending along a corner portion 56A interposed between the first surface portion 561 and the fourth surface portion 564 of the frame member 56. The jig is provided with a second pressing device configured to press a corner portion 56B interposed between the second surface portion 562 and the third surface portion 563 of the frame member 56 placed on the stage ST toward the center of the frame member 56. The corner portion 56A is brought into abutment with the projecting portion, and the corner portion 56B is pressed by the pressing device. In other words, the corner portion 56B is pressed toward the center of the frame member 56 along the direction orthogonal to the direction in which the arms 541 and 551 are arranged with respect to the light-shielding portions 542 and 552 (the Z-direction) by the pressing device. Accordingly, the state in which the positions of the arms 541 and 551 with respect to the light-shielding portions 542 and 552 are adjusted is maintained.

In addition, although illustration is omitted, the jig is provided with a third pressing device configured to press the arm 541 aligned in position with respect to the light-shielding portion 542 toward the stage ST, and a fourth pressing device configured to press the arm 551 aligned in position with respect to the light-shielding portion 552 toward the stage ST. With the provision of the third pressing device and the fourth pressing device, the arms 541 and 551 and the light-shielding portions 542 and 552 are pressed toward the stage ST, so that the state of positional alignment is maintained without rattling.

Step of Fixing Light-Shielding Fins

Figure 8:
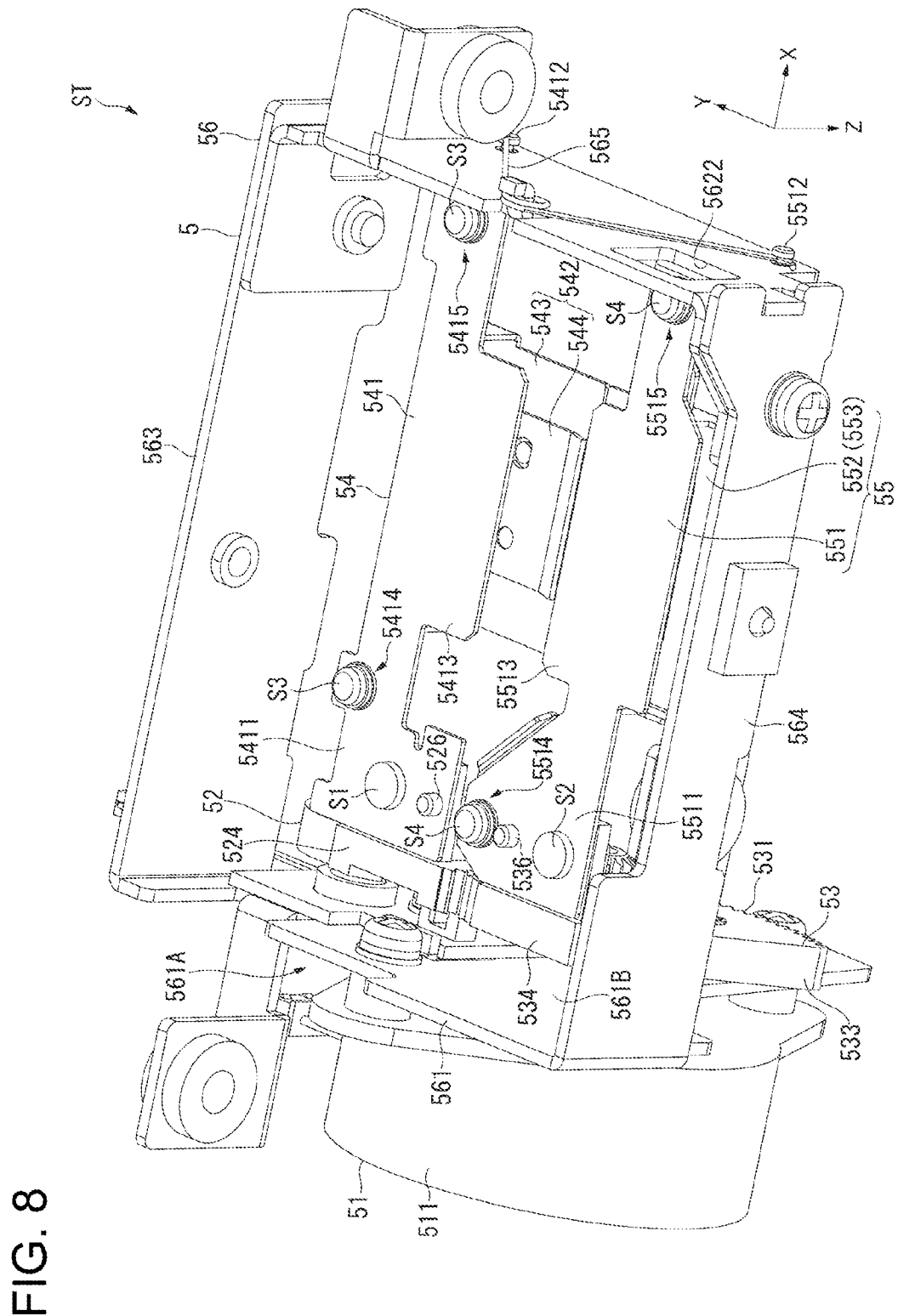
FIG. 8 is a drawing illustrating a step of fixing a light-shielding fin of the embodiment.

FIG. 8 is a perspective view illustrating the step of fixing the light-shielding fins.

In the step of fixing the light-shielding fins, the light-shielding portion 542 aligned in position in the step of aligning the arm position and the arm 541 are fixed with the screws S3 to constitute the light-shielding fin 54, and the light-shielding portion 552 aligned in position in the same manner and the arm 551 are fixed with the screws S4 to constitute the light-shielding fin 55. Specifically, the screw S3 inserted into the adjusting portion 5414 is screwed into the hole portion 5435, and the screw S3 inserted into the adjusting portion 5415 is screwed into the hole portion 5437, whereby the arm 541 and the light-shielding portion 542 are fixed, and the light-shielding fin 54 is obtained. The screw S4 inserted into the adjusting portion 5514 is screwed into the hole portion 5535, and the screw S4 inserted into the adjusting portion 5415 is screwed into the hole portion 5537, whereby the arm 551 and the light-shielding portion 552 are fixed, and the light-shielding fin 55 is obtained. In other words, the adjusting portions 5414, 5415, 5514, and 5515 are insertion holes in which the screws S3 and S4 are inserted.

With the step of fixing the light-shielding fins as described above, the light-shielding portions 542 and 552 are fixed to the corresponding arms 541 and 551 in a state in which a gap having a dimension in accordance with the set value is formed between the light-shielding portion 542 and the light-shielding portion 552.

These screws S3 and S4 have a head larger than the inner diameter of the adjusting portions 5414, 5415, 5514, and 5515 to which these screws S3 and S4 are to be inserted. Therefore, the head portions of the screws S3 and S4 are prevented from making too much inroads into the adjusting portions 5414, 5415, 5514, and 5515, and the arms 541 and 551 can be fixed reliably with the light-shielding portions 542 and 552.

According to the projector 1 of the embodiment described above, the following effects are achieved.

The mounting position of the arm 541 and the light-shielding portion 542 can be adjusted by the adjusting portions 5414 and 5415, and the mounting position of the arm 551 and the light-shielding portion 552 can be adjusted by the adjusting portions 5514 and 5515. Therefore, even when the component dimensions of the arms 541 and 551 and the light-shielding portions 542 and 552 provided as separate members vary, the light-shielding portions 542 and 552 can be positioned at adequate positions on the light-shielding fins 54 and 55, respectively. Therefore, the shielding of the light passing therethrough is adequately achieved.

The adjusting portions 5414 and 5415 are arranged at positions on the arm 541 which is not subject to incident light. Accordingly, the adjusting portions 5414 and 5415 can be arranged at a position away from the portion which tends to be raised to high temperature by shielding light. Therefore, an influence of heat generated by light shielding may be reduced and, a deformation of the adjusting portions 5414 and 5415 and hence distortion of the light-shielding portion 542 and the arm 541 may be restrained. The same effects are achieved also by the adjusting portions 5514 and 5515 arranged in the same manner as the adjusting portions 5414 and 5415 of the position on the light-shielding fin 54.

The adjusting portions 5414 and 5415 of the arm 541 are insertion holes through which the screws S3 are inserted, and the light-shielding portion 542 has the hole portions 5435 and 5437 into which the screws S3 are screwed at positions corresponding to the adjusting portions 5414 and 5415. The inner diameter of the adjusting portions 5414 and 5415 is larger than the inner diameter of the corresponding hole portions 5435 and 5437. In this configuration, the mounting position between the arm 541 and the light-shielding portion 542 may be adjusted within the range in which the hole portion 5435 is positioned in the adjusting portion 5414, and the hole portion 5437 is positioned in the adjusting portion 5415. Therefore, the arm 541 and the light-shielding portion 542 can be fixed reliably, and the adjustment of the mounting positions of these member is easily achieved, and the configuration of the adjusting portions 5414 and 5415 may be simplified. The same effects are achieved by the arm 551 having the adjusting portions 5514 and 5515, and the light-shielding portion 552 having the hole portions 5535 and 5537. The light-shielding portions 542 and 552 which shield light are raised to high temperature. However, since the screws S3 and S4 are employed as the fixing member, the arms 541 and 551 and the light-shielding portions 542 and 552 can be reliably fixed in comparison with the case where the adhesive agent is employed.

The light-shielding portions 542 and 552 need to be arranged at adequate positions on the light-shielding fins 54 and 55, which are moved in association with the rotation of the gears 52 and 53. Therefore, with the manufacturing method described above, the light-shielding portions 542 and 552 are placed on the stage ST, which is a flat surface, and then the arms 541 and 542 fixed to the gears 52 and 53 so as to overlap with the light-shielding portions 542 and 552 at the time of manufacturing (assembling) the light control unit 5.

Here, the adjusting portions 5414 and 5415 through which the screws S3 are inserted are provided in the arm 541, and the hole portions 5435 and 5437 into which the screws S3 are screwed are provided in the light-shielding portion 542 covered by the arm 541. Accordingly, the arm 541 and the light-shielding portion 542 arranged respectively on the stage ST may be easily fixed from the direction in which the arm 541 is arranged with respect to the light-shielding portion 542. Therefore, the arm 541 and the light-shielding portion 542 may be fixed easily. The same effects are achieved also for the arm 551 and the light-shielding portion 552 having the same configuration as the arm 541 and the light-shielding portion 542.

According to the manufacturing method described above, the light control unit 5 which achieves the effects as described above may be manufactured easily.

In the step of aligning the arm position, the arms 541 and 551 and the light-shielding portions 542 and 552 are pressed toward the stage ST by the third pressing device and the fourth pressing device. In this configuration, the alignment of these members is achieved without rattling.

In the step of aligning the arm position, the corner portion 56B is pressed by the second pressing device in the direction substantially orthogonal to the direction in which the arms 541 and 551 are arranged with respect to the light-shielding portions 542 and 552 in a state in which the corner portion 56A is brought into abutment with the projecting portion provided on the jig. Accordingly, the state in which the positions of the arms 541 and 551 and the light-shielding portions 542 and 552 are adjusted may be maintained. Therefore, the fixation between the arms 541 and 551 and the light-shielding portions 542 and 552 may be achieved further easily.

Modification

The invention is not limited to the embodiment described above, and includes modification and improvement within the scope which can achieve the advantages of the invention.

In the embodiment described above, the light-shielding fins 54 and 55 respectively have a configuration in which the light-shielding fins 54 and 55 are moved in and out of the passage area of light by the rotation of the end portions (the end portions where the depressions 5433 and 5533 are formed) of the light-shielding portions 542 and 552 of the light-shielding fins 54 and 55 toward and away from each other about an axis of rotation extending along the X-direction orthogonal to the illumination optical axis Ax. However, the invention is not limited thereto. In other words, a configuration in which the light-shielding fins 54 and 55 are moved in and out of the passage area of light by the movement of the light-shielding fins 54 and 55 along the Y-direction orthogonal to the illumination optical axis Ax.

Also, the motor 51 and the gears 52 and 53 constitute part of the moving device according to the invention. However, the invention is not limited thereto. In other words, any configuration of the moving device is applicable as long as the light-shielding fins 54 and 55 can be moved in and out of the passage area of light.

In the embodiment, the light control unit 5 has a configuration including the light-shielding fin 54 having the arm 541 and the light-shielding portion 542 as separate members, and the light-shielding fin 55 having the arm 551 and the light-shielding portion 552 as the separate members. However, the invention is not limited thereto. In other words, a configuration in which one of the light-shielding fins 54 and 55 has the arm and the light-shielding portion integrated or fixed in advance. In this case, the light-shielding portion of the one of the light-shielding fins is aligned in position with respect to the light-shielding portion of the other light-shielding fin, and the other arm is aligned in position with the other light-shielding portion, and then the other arm and the other light shielding portion are fixed. In this case as well, the same effects as the light control unit 5 described above are achieved. The number of light-shielding fins is not limited to two, and may be changed as needed.

In the embodiment described above, the arm 541 has the adjusting portions 5414 and 5415. However the invention is not limited thereto. In other words, a configuration in which the light-shielding portion 542 has an adjusting portion is also applicable. In this case, the light-shielding portion 542 and the arm 541 arranged on the stage ST may be fixed with the screws S3, which are inserted into the adjusting portion from the stage ST side. The same applies to the light-shielding fin 55 as well. The arm and the light-shielding portion may be fixed with a configuration other than the screw.

In the embodiment, the adjusting portions 5414 and 5415 are configured as circular elongated holes. However, the invention is not limited thereto. In other words, if the inner diameter is larger than the corresponding hole portion, the adjusting portion may be a hole having other shapes such as a true circular shape, an oval shape, or a polygonal shape. The same applies to the adjusting portions 5514 and 5515. In such a case as well, the screw with a head portion larger than the inner diameter of the hole may be employed.

In addition, if the configuration allows the fixation after the positional alignment between the arm and the light-shielding portion, the configuration of the adjusting portion which can adjust the mounting position may be of other configurations, and the number of the adjusting portions may be changed as needed.

Figure 9:
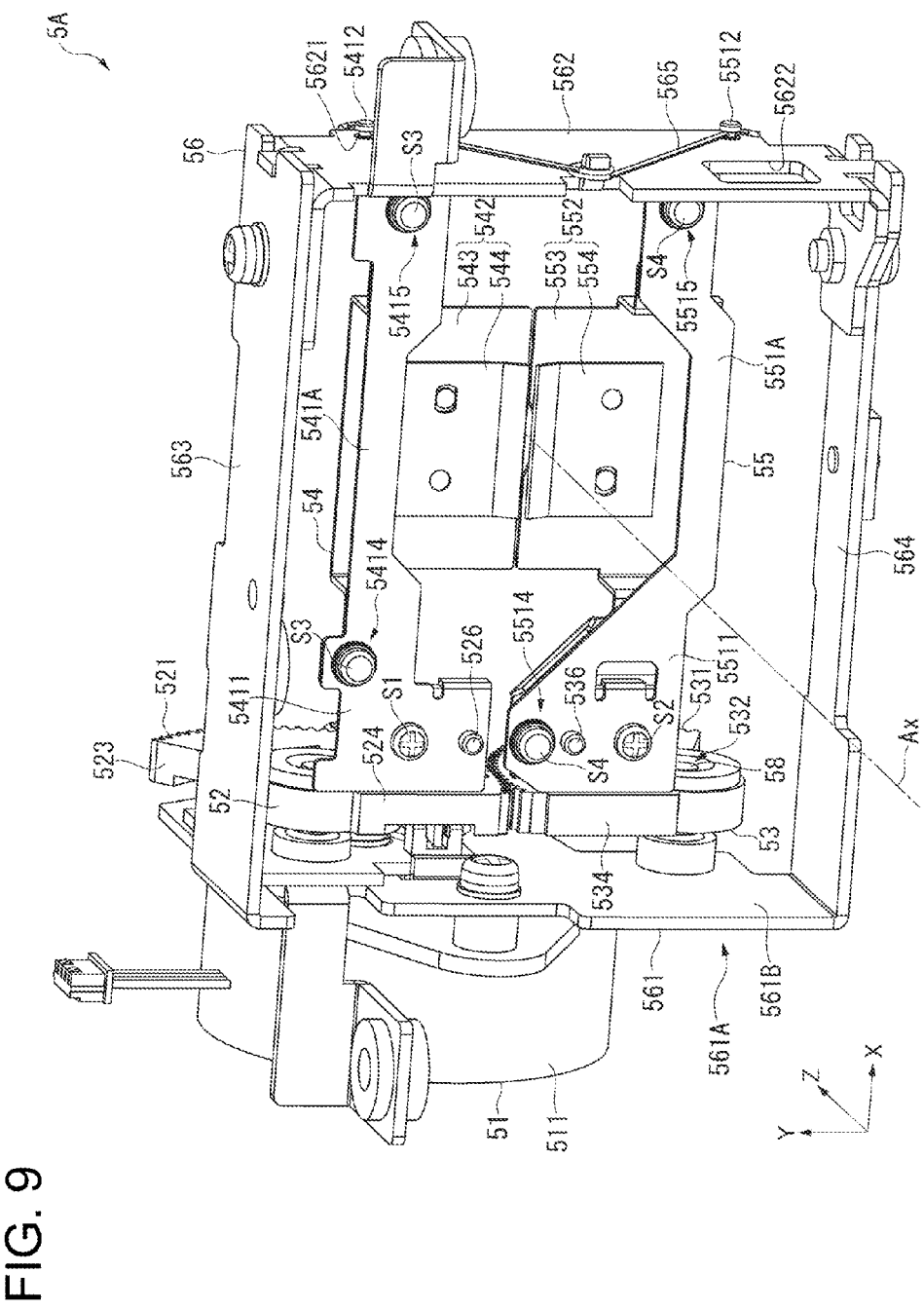
FIG. 9 is a perspective view illustrating a modification of the light control unit of the embodiment.

FIG. 9 is a perspective view of a light control unit 5A as a modification of the light control unit 5 viewed from the light incident side (the side opposite to the Z-direction).

In the embodiment, the arms 541 and 551 include the arm-side light-shielding portions 5413 and 5513 respectively arranged within the passage area of light by the arms 541 and 551 being rotated in association with the rotation of the gears 52 and 53. However, the invention is not limited thereto.

For example, the light control unit 5A illustrated in FIG. 9 has the same configuration and function as the light control unit 5 described above except that arms 541A and 551A are provided instead of the arms 541 and 551. The arms 541A and 551A include the substantially same configuration and function as the arms 541 and 551 respectively. However, the arm-side light-shielding portions 5413 and 5513 are not provided. With the light control unit 5A having the arms 541A and 551A as described above, the same effects as the above-described light control unit 5 are achieved.

In the embodiment, the light-shielding fins 54 and 55 are arranged symmetrically about the center axis of light passing through the light control unit 5 (in the embodiment, the light outgoing from the first lens array 321 and incident on the second lens array 322). However, the invention is not limited thereto. In other words, the light-shielding fins 54 and 55 need only be arranged so as to oppose each other about the center axis and, in addition, need only be arranged with the center axis interposed therebetween.

In the embodiment, the projector 1 includes three liquid crystal panels 353 (353R, 353G, and 353B). However, the invention is not limited thereto. In other words, the invention may be applied to projectors employing two or less or four or more liquid crystal panels.

In the embodiment, a configuration in which the optical apparatus 3 has a substantially L-shape in plan view is described. However, the invention is not limited thereto, and for example, a configuration having a substantially U-shape in plan view is also applicable.

In the embodiment, the transmissive liquid crystal panels 353 having a light incident surface and a light outgoing surface different from each other have been used. However, a reflecting liquid-crystal panel in which the light incident surface and the light outgoing surface are identical may be used. Light-modulating units other than liquid crystal such as a device using a micro mirror, for example, DMD (Digital Micromirror Device) are also applicable as long as the light-modulating unit is capable of modulating the incident optical flux and forming images in accordance with the image information.

In the embodiment, a front type projector a direction of projection of an image and the direction of observation of the image of which are substantially the same is exemplified. However, the invention is not limited thereto. For example, the invention may be applied to a rear type projector the direction of projection and the direction of observation of which are opposite directions.

In the embodiment, the example in which the light control unit 5 is employed in the projector 1 is exemplified. However, the invention is not limited thereto. In other words, the light control unit according to the invention is applicable to an electronic equipment such as an illuminating equipment.

The entire disclosure of Japanese Patent Application No. 2013-256720, filed Dec. 12, 2013 is expressly incorporated by reference herein.

What is claimed is:

1. A light control unit comprising:
a first light-shielding fin and a second light-shielding fin arranged to have a center axis of light passing therethrough interposed therebetween, and
a moving device configured to move the first light-shielding fin and the second light-shielding fin so that respective end portions of the first light-shielding fin and the second light-shielding fin move in directions toward and away from each other, wherein
the first light-shielding fin and the second light-shielding fin each including:
an arm configured to engage the moving device and to be moved by the moving device; and
a light-shielding portion provided on the arm and configured to move with the arm to be arranged in a passage area of the light, and
at least one of the first light-shielding fin and the second light-shielding fin includes an adjusting portion configured to adjust a mounting position between the arm and the light-shielding portion, the arm and the light-shielding portion being separate members.

2. The light control unit according to claim 1, wherein
the light-shielding portion includes a body portion arranged in the passage area and an extending portion extending from the body portion, and
the adjusting portion is arranged either on the arm at a position corresponding to the extending portion or on the extending portion.

3. The light control unit according to claim 2, wherein
one of the arm and the light-shielding portion includes a hole portion to which a fixing member configured to fix the arm and the light-shielding portion is fixed, and
the other one of the arm and the light-shielding portion includes an insertion hole as the adjusting portion, the insertion hole having an inner diameter larger than that of the hole portion and configured to allow insertion of the fixing member.

4. The light control unit according to claim 3, wherein
the arm includes the adjusting portion, and
the light-shielding portion includes the hole portion.

5. A projector comprising:
a light source unit;
a light-modulating unit configured to modulate light emitted from the light source unit;
a projection optical unit configured to project modulated light; and the light control unit according to claim 1 arranged on a light path of the light incident on the light-modulating unit from the light source unit.

6. A projector comprising:
a light source unit;
a light-modulating unit configured to modulate light emitted from the light source unit;
a projection optical unit configured to project modulated light; and
the light control unit according to claim 2 arranged on a light path of the light incident on the light-modulating unit from the light source unit.

7. A projector comprising:
a light source unit;
a light-modulating unit configured to modulate light emitted from the light source unit;
a projection optical unit configured to project modulated light; and
the light control unit according to claim 3 arranged on a light path of the light incident on the light-modulating unit from the light source unit.

8. A projector comprising:
a light source unit;
a light-modulating unit configured to modulate light emitted from the light source unit;
a projection optical unit configured to project modulated light; and
the light control unit according to claim 4 arranged on a light path of the light incident on the light-modulating unit from the light source unit.

9. A method of manufacturing a light-control unit including
a first light-shielding fin and a second light-shielding fin arranged to have a center axis of light passing therethrough interposed therebetween, and a moving device configured to move the first light-shielding fin and the second light-shielding fin so that respective end portions of the first light-shielding fin and the second light-shielding fin move in directions toward and away from each other, wherein
the first light-shielding fin and the second light-shielding fin each include an arm configured to engage the moving device and to be moved by the moving device and a light-shielding portion provided on the arm and configured to move with the arm to be arranged in a passage area of the light,
in at least one of the first light-shielding fin and the second light-shielding fin, (1) the arm and the light-shielding portion are separate members, (2) the light-shielding portion includes a hole portion to which a fixing member configured to fix the arm and the light-shielding portion is fixed, and (3) the arm includes an insertion hole having an inner diameter larger than that of the hole portion, formed at a position corresponding to the hole portion, and configured to allow insertion of the fixing member, the method of manufacturing comprising:
arranging the light-shielding portion configured as a separate member from the arm on a flat surface;
overlapping the arm engaged with the moving device on the light-shielding portion arranged on the flat surface to position the arm with respect to the light-shielding portion in a state in which a relative position between the light-shielding portions of the first light-shielding fin and the second light-shielding fin is adjusted; and
fixing the fixing member inserted into the insertion hole to the hole portion to fix the light-shielding portion and the arm in a state in which the relative position is maintained.

10. The method of manufacturing the light control unit according to claim 9, further comprising:
pressing the light-shielding portion and the arm toward the flat surface to fix the light-shielding portion and the arm after the light-shielding portion and the arm have been positioned.

11. The method of manufacturing the light control unit according to claim 9, wherein
the light control unit includes a frame member to which the moving device is attached, and the method of manufacturing comprising:
pressing the frame member in a direction substantially orthogonal to a direction of arrangement of the arm with respect to the light-shielding portion to position the light-shielding portion and the arm when the arm is positioned with respect to the light-shielding portion.

\* \* \* \* \*